US010824529B2

(12) United States Patent
Chaudhari et al.

(10) Patent No.: US 10,824,529 B2
(45) Date of Patent: Nov. 3, 2020

(54) FUNCTIONAL SAFETY SYSTEM ERROR INJECTION TECHNOLOGY

(71) Applicant: Intel Corporation, Santa Clara, CA (US)

(72) Inventors: Prashant Chaudhari, Folsom, CA (US); Michael Derr, El Dorado Hills, CA (US); Gustavo Espinosa, Portland, OR (US); Balaji Vembu, Folsom, CA (US); Richard Shannon, Portland, OR (US); Bradley Coffman, Hillsboro, OR (US); Daniel Knollmueller, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 15/857,885

(22) Filed: Dec. 29, 2017

(65) Prior Publication Data
US 2019/0050308 A1    Feb. 14, 2019

(51) Int. Cl.
*G06F 11/22*    (2006.01)
*G06F 11/263*    (2006.01)

(52) U.S. Cl.
CPC ........ *G06F 11/263* (2013.01); *G06F 11/2205* (2013.01); *G06F 11/2215* (2013.01); *G06F 11/2284* (2013.01)

(58) Field of Classification Search
CPC ............... G06F 11/2284; G06F 11/263; G06F 11/2205; G06F 11/22; G06F 11/221; G06F 11/2215
See application file for complete search history.

(56) References Cited

U.S. PATENT DOCUMENTS

| | | | | | |
|---|---|---|---|---|---|
| 5,001,712 | A | * | 3/1991 | Splett ................. | G06F 11/2215 714/41 |
| 6,134,676 | A | * | 10/2000 | VanHuben .......... | G06F 11/3466 714/39 |
| 6,546,507 | B1 | * | 4/2003 | Coyle .................. | G06F 11/221 714/32 |
| 2002/0095624 | A1 | * | 7/2002 | Cabezas ............... | G06F 11/221 714/43 |
| 2003/0172321 | A1 | * | 9/2003 | Wolin ................. | G06F 11/2215 714/41 |
| 2009/0122812 | A1 | * | 5/2009 | Steiner ................. | H04J 3/0652 370/503 |
| 2014/0019814 | A1 | * | 1/2014 | McNairy ............. | G06F 11/2215 714/49 |

(Continued)

OTHER PUBLICATIONS

Sahaana et al. "Dynamic Fault Tolerance System for Testing Multiple FAult Defects". International Journal of Advanced Information Science and Technology. Feb. 2013.*

(Continued)

*Primary Examiner* — Yolanda L Wilson
(74) *Attorney, Agent, or Firm* — Jordan IP Law, LLC (57) ABSTRACT

Systems, apparatuses and methods may provide for technology that detects a startup of a system on chip (SoC) and injects, during the startup, one or more domain startup errors into a plurality of domains on the SoC. Additionally, the technology may determine whether the domain startup error(s) were detected during the startup. In one example, the plurality of domains include one or more fabric interfaces.

22 Claims, 5 Drawing Sheets

(56) References Cited

U.S. PATENT DOCUMENTS

| | | | | |
|---|---|---|---|---|
| 2014/0019818 | A1* | 1/2014 | Jindal | G06F 21/556 714/724 |
| 2014/0028086 | A1* | 1/2014 | Hammerschmidt | B60R 21/0173 307/1 |
| 2014/0173361 | A1* | 6/2014 | Meaney | G06F 11/004 714/47.2 |
| 2015/0008957 | A1* | 1/2015 | Olgiati | G06F 17/5027 326/38 |
| 2015/0382120 | A1* | 12/2015 | Baskaran | H04R 29/001 381/56 |
| 2018/0024900 | A1* | 1/2018 | Premerlani | G06F 11/2215 714/41 |

OTHER PUBLICATIONS

Khan et al. "Hardware Software Codesign of a Safety-Critical Embedded Computer System for an Automatic Endoscope". IEEE. May 2002.*

* cited by examiner

FUNCTIONAL SAFETY SYSTEM ERROR INJECTION TECHNOLOGY

TECHNICAL FIELD

Embodiments generally relate to functional safety systems. More particularly, embodiments relate to functional safety system error injection technology.

BACKGROUND

Safety may be a concern in a wide variety of systems such as, for example, autonomous vehicles. The systems may include system on chip (SoC) computing architectures having many functional domains (e.g., intellectual property/IP blocks, computing blocks) that are interconnected by fabric interfaces. Some domains may detect errors only during normal operation, whereas other domains may not perform any error detection at all (e.g., relying on the error detection of subsequent domains in a data/control path). Such a non-uniform solution may increase the risk of larger (e.g., "storm," "domino effect") functional failures at mission critical moments in time.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
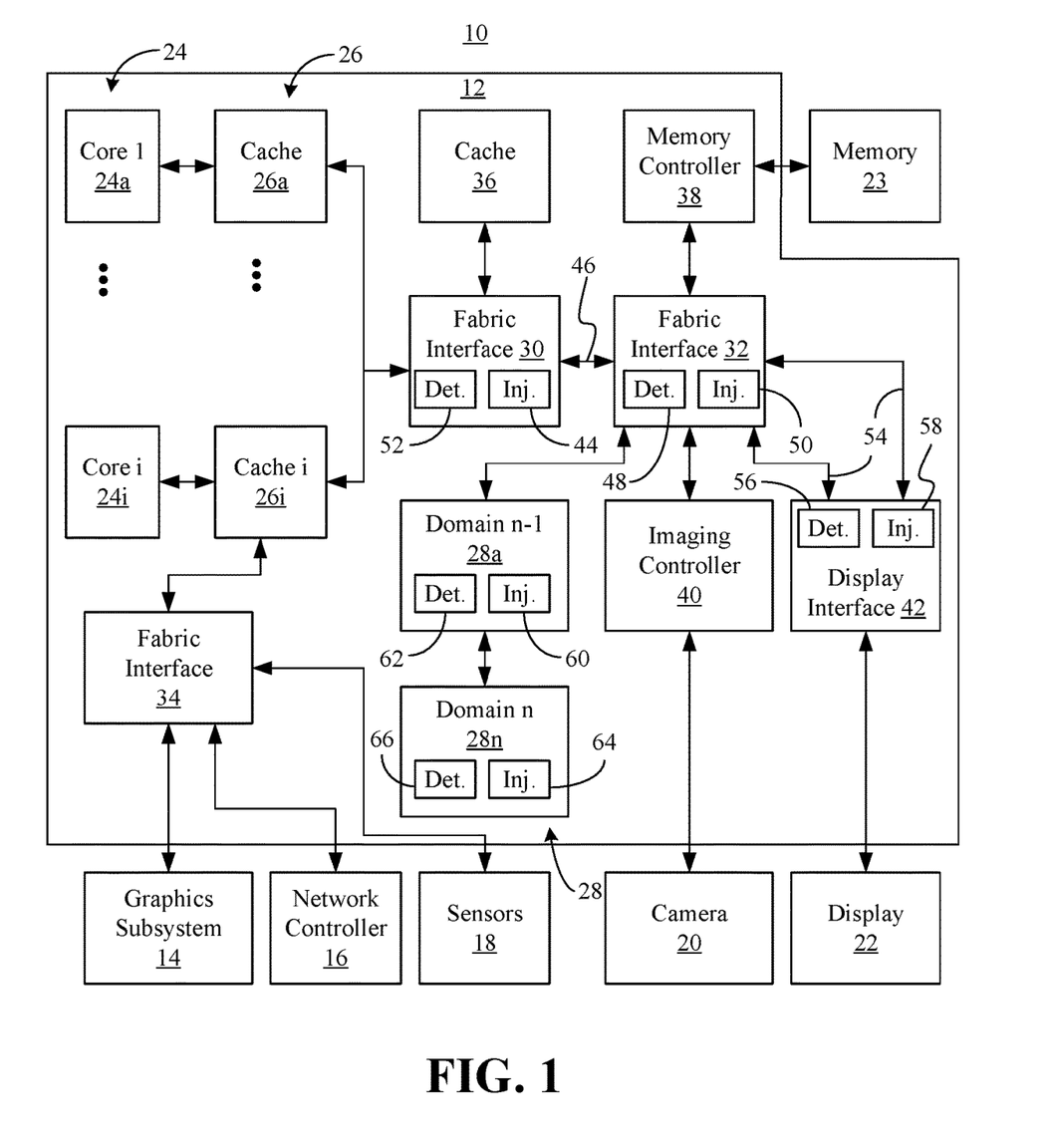
FIG. 1 is a block diagram of an example of a computing system according to an embodiment.

Turning now to FIG. 1, a computing system 10 is shown in which a system on chip (SoC) 12 is coupled to a graphics subsystem 14 (e.g., graphics processor, graphics processing unit/GPU, graphics pipeline, etc.), a network controller 16 (e.g., wireless and/or wired communications interface), a plurality of sensors 18, a camera 20, a memory 23 and a display 22 (e.g., liquid crystal display/LCD, light emitting diode/LED display, etc.). The computing system 10 may be, for example, an automotive (e.g., autonomous vehicle), industrial, artificial intelligence (AI), military, aerospace and/or governmental system that performs one or more operations having safety concerns. In the illustrated example, a plurality of cores 24 (24a-24i, e.g., processor cores) use corresponding caches 26 (26a-26i) to perform operations in support of other components of the SoC 12. For example, a plurality of domains 28 (28a-28n, e.g., functional domains, IP blocks, computing blocks) might manage autonomous vehicle operations such as, for example, navigation, climate control, etc., wherein the illustrated domains 28 are coupled to the caches 26 via a first fabric interface 30 and a second fabric interface 32. The illustrated SoC 12 also includes a third fabric interface 34, a cache 36, a memory controller 38, an imaging controller 40 and a display interface 42 (e.g., display engine). The fabric interfaces 30, 32, 34, the imaging controller 40 and the display interface 42 may also be considered functional domains.

As will be discussed in greater detail, the SoC 12 may use distributed error injection to uniformly detect internal errors across the components of the SoC 12 during startup and/or shutdown. For example, the first fabric interface 30 may include an error injector 44 (e.g., including logic instructions, configurable logic, fixed-functionality hardware logic, etc., or any combination thereof) that injects link startup errors and/or link shutdown errors into a bus 46 that interconnects the first fabric interface 30 with the second fabric interface 32. The link errors may include, for example, parity errors, packet errors, cyclical redundancy check (CRC) errors, error correction code (ECC) errors, etc., or any combination thereof.

Thus, a link startup and/or shutdown error might be a digital message having an incorrect parity bit. In another example, the link startup and/or shutdown error may be a packet containing incorrect header information. The second fabric interface 32 may include a detector 48 (e.g., including logic instructions, configurable logic, fixed-functionality hardware logic, etc., or any combination thereof) to determine whether the error (e.g., incorrect parity bit, header information, etc.) is detected at the second fabric interface 32 during the startup and/or shutdown. Similarly, the second fabric interface 32 may include an error injector 50 that injects link startup errors and/or link shutdown errors into the bus 46, wherein a detector 52 in the first fabric interface 30 determines whether the link startup and/or shutdown errors are detected at the first fabric interface 30 during the startup and/or shutdown.

The injector 44 may also inject domain startup and/or shutdown errors into the first fabric interface 30, wherein the detector 52 determines whether the errors were detected within the first fabric interface 30 during the startup and/or shutdown. Additionally, the injector 50 may inject the domain startup and/or shutdown errors into the second fabric interface 32, wherein the detector 48 determines whether the errors were detected within the second fabric interface 32 during the startup and/or shutdown. The domain errors may include, for example, parity errors, packet errors, CRC errors, ECC errors, etc., or any combination thereof.

The injector 50 of the second fabric interface 32 may also inject link startup errors and/or link shutdown errors into a plurality of busses 54 that interconnect the second fabric interface 32 with the display interface 42. The illustrated display interface 42 includes a detector 56 to determine whether the link startup and/or shutdown errors were detected at the display interface 42 during the startup and/or shutdown. The display interface 42 may also include an injector 58 to inject link startup errors and/or link shutdown errors into the plurality of buses 54, wherein the detector 48 of the second fabric interface 32 may determine whether the link startup and/or shutdown errors were detected during the startup and/or shutdown. Additionally, the illustrated injector 58 may inject domain startup errors and/or domain shutdown errors into the display interface 42. In such a case, the detector 56 may determine whether the domain startup and/or shutdown errors were detected within the display interface 42 during the startup and/or shutdown.

The domains 28 may also participate in the uniform granularity error detection architecture described herein. For example, a first domain 28a may include an error injector 60 that injects domain startup errors and/or domain shutdown errors into the first domain 28a. The error injector 60 may also inject link startup errors and/or link shutdown errors into the interconnects between the domains 28. Thus, the injector 60 might generate/obtain an incorrect polynomial division remainder of a block of data and attach the incorrect remainder to the block of data as a CRC domain startup and/or shutdown error. The illustrated first domain 28a also includes a detector 62 to determine whether the domain startup and/or shutdown errors were detected within the first domain 28a during startup and/or shutdown. The detector 62 may also determine whether the link startup and/or shutdown errors were detected at the interconnects during startup and/or shutdown. Thus, in the above example, the detector 62 would determine (e.g., calculate or lookup) the polynomial division remainder of the block of data and compare the determined remainder to the remainder attached to the block of data. If the remainders do not match, then the first domain 28a may be deemed to have an error.

Similarly, an $n^{th}$ domain 28n may include an error injector 64 that injects domain startup errors and/or domain shutdown errors into the $n^{th}$ domain 28n, wherein a detector 66 determines whether the domain startup and/or shutdown errors were detected within the $n^{th}$ domain 28n during startup and/or shutdown. Similarly, the error injector 64 may inject link startup errors and/or link shutdown errors into the interconnects between the domains 29 and the detector 66 may determine whether the link startup and/or shutdown errors were detected at the interconnects during startup and/or shutdown. Thus, if the domains 28 represent a data/control path, error detection may be implemented uniformly along the path. Accordingly, an error in the first domain 28a might be detected during startup and before it cascades to the $n^{th}$ domain 28n at runtime (e.g, as an error storm/domino effect). The uniform error injection and detection technology may also be incorporated into other components of the SoC 12.

As will be discussed in greater detail, if errors are detected during the startup of the SoC 12, one or more error correction operations may be initiated prior to completion of the startup. As a result, functional errors may be mitigated and/or resolved prior to normal operation (e.g., runtime and/or mission critical moments in time), which may in turn enhance safety. Thus, if the computing system 10 is an autonomous vehicle, passenger safety may be substantially improved by the illustrated solution. Additionally, if errors are detected during the shutdown of the SoC 12, one or more error correction operations may be initiated prior to a subsequent startup of the SoC 12. Thus, long-term fixes might be reported and/or conducted while the computing system 10 is not being operated.

Figure 2A:
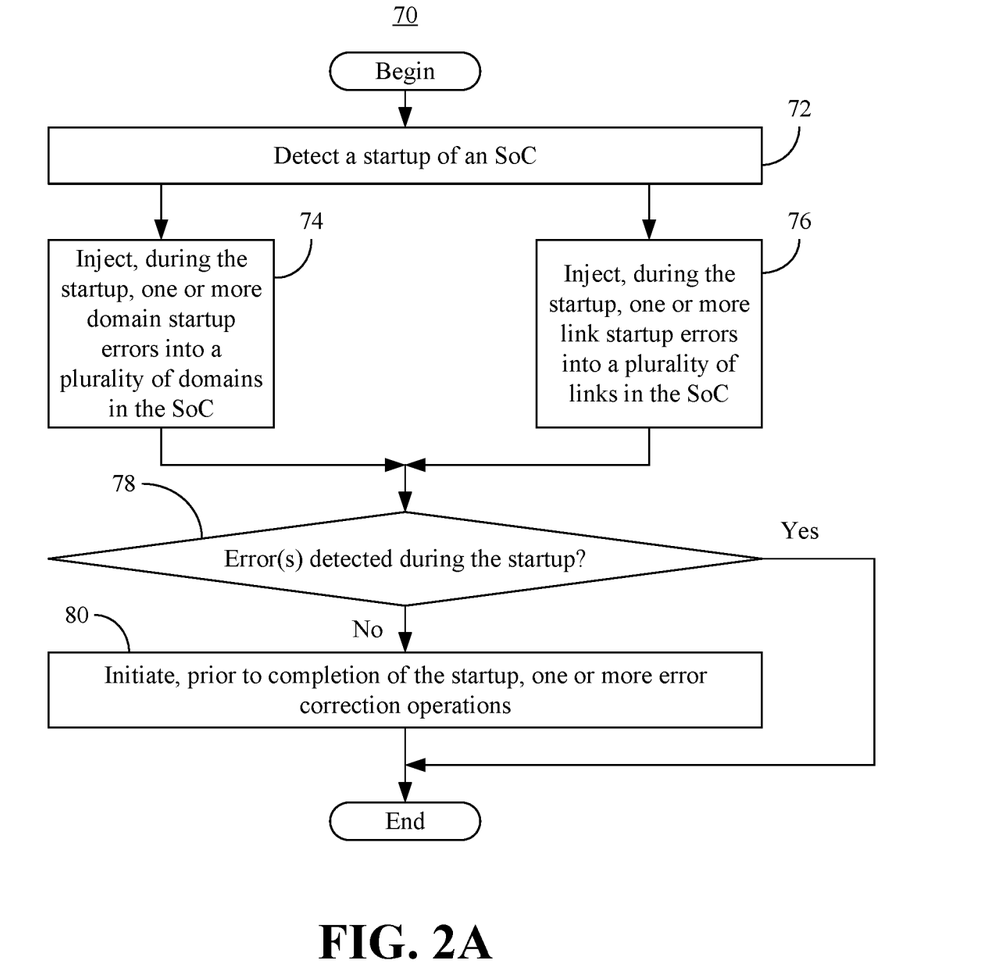
FIG. 2A is a flowchart of an example of a method of detecting errors during the startup of a system on chip (SoC) according to an embodiment.

FIG. 2A shows a method 70 of detecting errors during the startup of an SoC. The method 70 may generally be implemented in distributed error injectors/detectors of an SoC such as, for example, the SoC 12 (FIG. 1). More particularly, the method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 provides for detecting a startup (e.g., boot sequence) of an SoC. Block 74 may inject, during the startup, one or more domain startup errors into a plurality of domains in the SoC. Additionally, illustrated block 76 injects, during the startup, one or more link startup errors into a plurality of links in the SoC. A determination may be made at block 78 as to whether the domain startup errors and/or the link startup errors were detected during the startup. If so, the method 70 may terminate. Otherwise, block 80 may initiate, prior to completion of the startup, one or more error correction operations. Block 80 may include, for example, resetting the SoC, reconfiguring domains and/or links, recommending mission aborts, using alternative SoC components, reporting the failure to detect the error(s), conducting diagnostics, installing replacement code, disabling links/domains, and so forth.

Figure 2B:
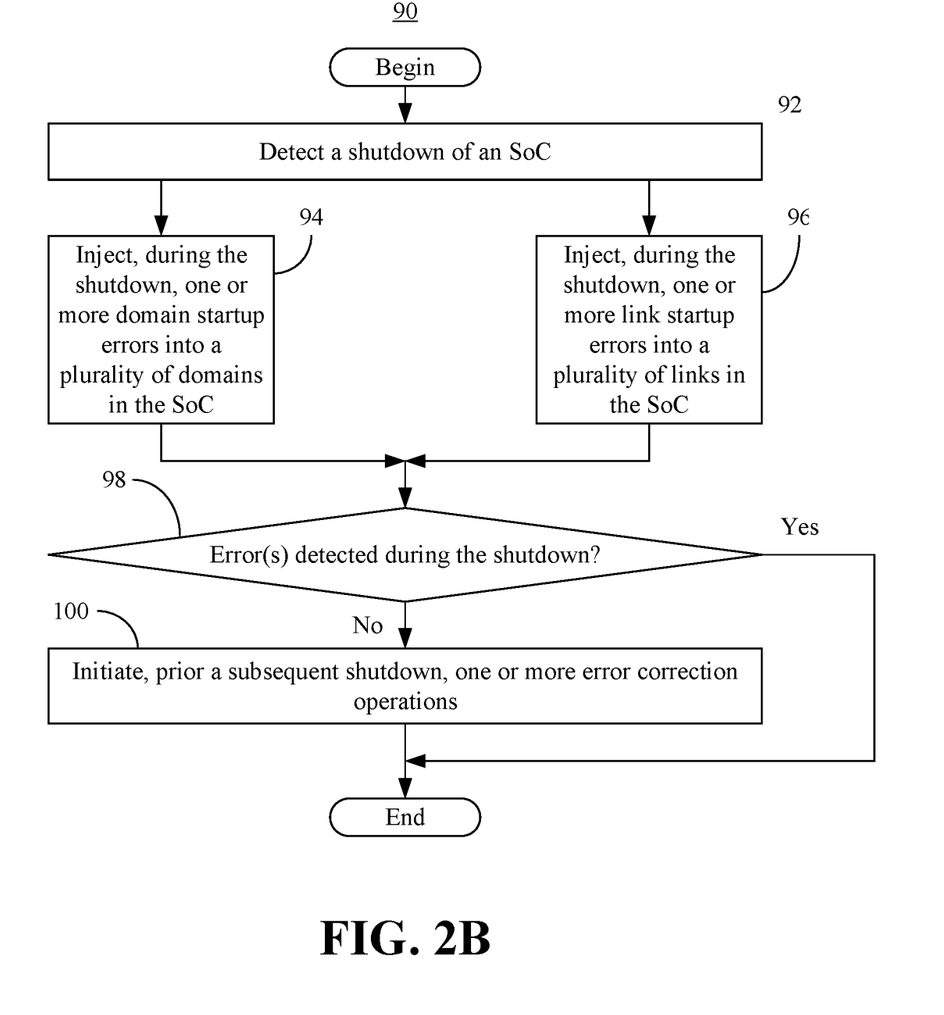
FIG. 2B is a flowchart of an example of a method of detecting errors during the shutdown of an SoC according to an embodiment.

FIG. 2B shows a method 90 of detecting errors during the shutdown of an SoC. The method 90 may generally be implemented in distributed error injectors/detectors of an SoC such as, for example, the SoC 12 (FIG. 1). More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 92 provides for detecting a shutdown (e.g., key off) of an SoC. Block 94 may inject, during the shutdown, one or more domain shutdown errors into a plurality of domains in the SoC. Additionally, illustrated block 96 injects, during the shutdown, one or more link shutdown errors into a plurality of links in the SoC. A determination may be made at block 98 as to whether the domain shutdown errors and/or the link shutdown errors were detected during the shutdown. If so, the method 90 may terminate. Otherwise, block 100 may initiate, prior to completion of the shutdown, one or more error correction operations. Block 100 may include, for example, resetting the SoC, reconfiguring domains and/or links, recommending mission aborts, using alternative SoC components, reporting the failure to detect the error(s), installing replacement code, disabling links/domains, conducting diagnostics, requesting long-term maintenance, offlining the SoC, and so forth.

Figure 3:
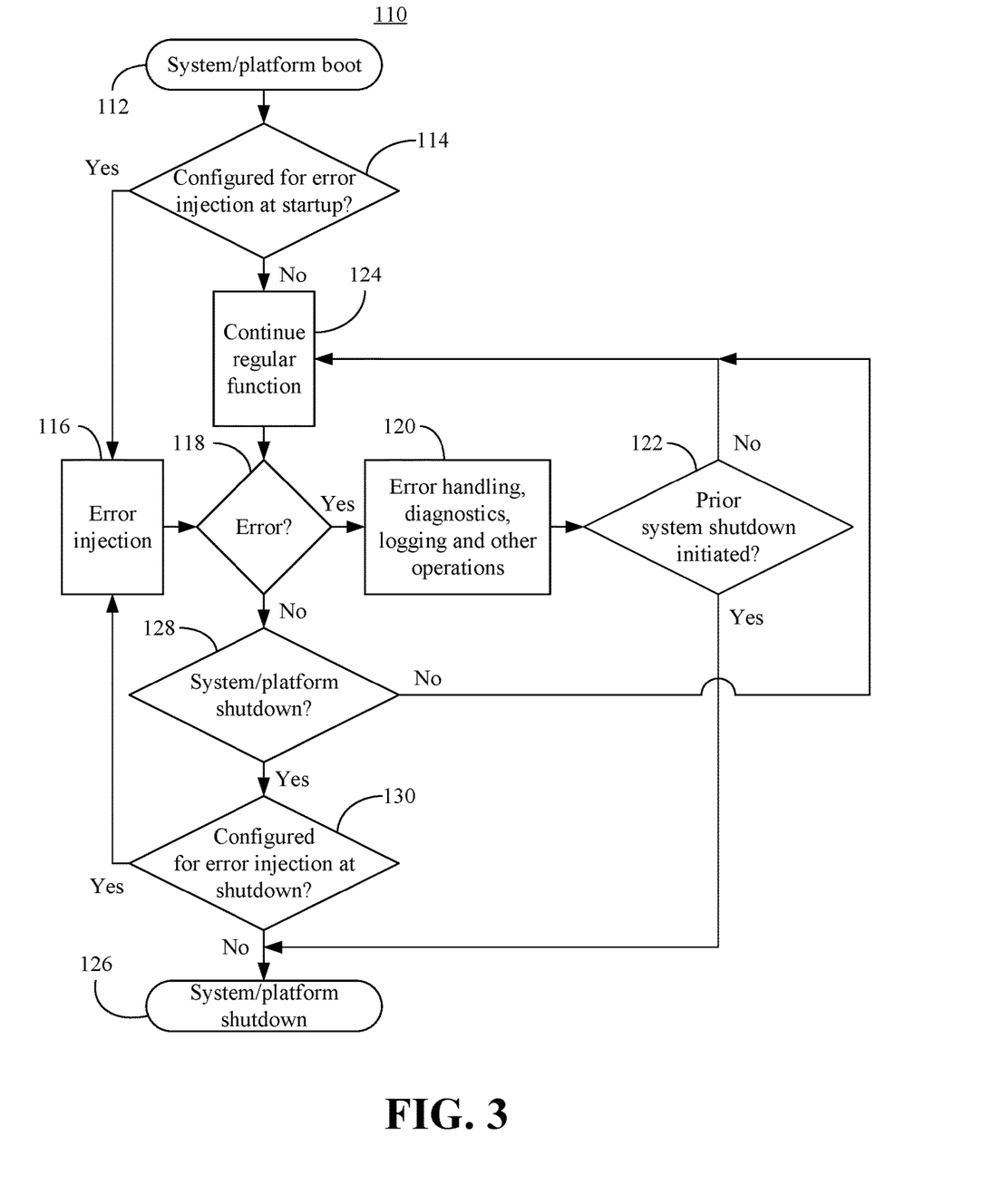
FIG. 3 is a flowchart of an example of a method of operating an SoC according to an embodiment.

FIG. 3 shows a method 110 of operating an SoC. The method 110 may generally be implemented in distributed error injectors/detectors of an SoC such as, for example, the SoC 12 (FIG. 1). More particularly, the method 110 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 112 boots the system and/or platform containing the SoC. A determination may be made at block 114 as to whether the SoC is configured for error injection at startup. If so one or more errors (e.g., domain startup errors and/or link startup errors) may be injected into the components of the SoC at block 116. Block 118 may determine whether the components of the SoC are exhibiting error (e.g., failing to detect the injected errors). If so, illustrated block 120 initiates and/or conducts error handling, diagnostics, logging and other error correction operations. Block 122 may determine whether a prior system shutdown has been initiated. If a prior system shutdown has not been initiated, regular function may be continued at block 124. If a prior system shutdown has been initiated, the method 110 may terminate at block 126. If it is determined at block 114 that the SoC is not configured for error injection at startup, the illustrated method 110 proceeds directly to block 124 and continues regular function.

If it is determined at block 118 that the components of the SoC are not exhibiting error, a determination may be made at block 128 as to whether a system/platform shutdown has been initiated. If not, the method 110 may return to regular function at block 124. Otherwise, illustrated block 130 determines whether the SoC is configured for error correction at shutdown. If so, block 116 may inject domain and/or link shutdown errors into the components of the SoC and the illustrated method 110 returns to the determination at block 118. If the SoC is not configured for error correction at shutdown, the method 110 may terminate at block 126.

Figure 4:
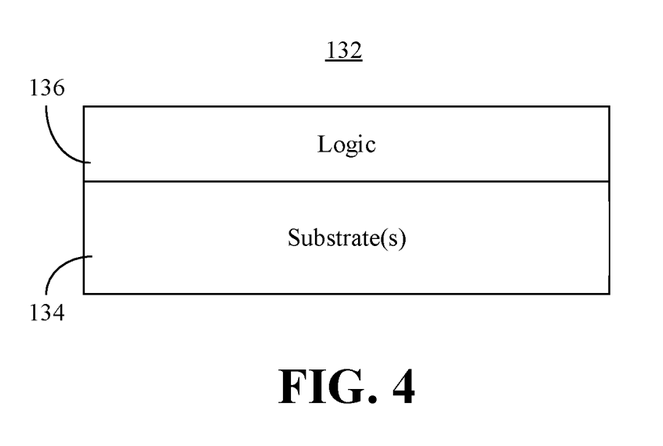
FIG. 4 is an illustration of an example of a semiconductor package apparatus according to an embodiment.

FIG. 4 shows an SoC 132 (e.g., semiconductor package apparatus, chip, die, etc.). The SoC 132 may implement one or more aspects of the method 70 (FIG. 2A), the method 90 (FIG. 2B) and/or the method 110 (FIG. 3), already discussed. The illustrated SoC 132 includes one or more substrates 134 (e.g., silicon, sapphire, gallium arsenide) and logic 136 (e.g., transistor array and other integrated circuit/ IC components) coupled to the substrate(s) 134. The logic 136 may be implemented at least partly in configurable logic or fixed-functionality logic hardware. In one example, the logic 136 includes transistor channel regions that are positioned (e.g., embedded) within the substrate(s) 134. Thus, the interface between the logic 136 and the substrate(s) 134 may not be an abrupt junction. The logic 136 may also be considered to include an epitaxial layer that is grown on an initial wafer of the substrate(s) 134.

In one example, the logic 136 includes a plurality of domains (e.g., fabric interfaces, functional blocks) and a plurality of links (e.g., busses). The logic 136 may also include a distributed set of injectors to inject, during a startup of the SoC 132, one or more domain startup errors into the plurality of domains, and a distributed set of detectors to determine whether the domain startup error(s) were detected during the startup. The set of injectors may also inject, during the startup, one or more link startup errors into the plurality of links, wherein set of detectors determine whether the link startup error(s) were detected during the startup. If either the domain startup errors or the link startup errors were not detected during the startup, the logic 136 may initiate one or more error correction operations prior to completion of the startup.

Moreover, the injectors of the logic 136 may inject, during a shutdown of the SoC 132, one or more domain shutdown errors into the plurality of domains, wherein the detectors determine whether the domain shutdown error(s) were detected during the shutdown. The injectors may also inject, during the shutdown, one or more link shutdown errors into the plurality of links, wherein the detectors determine whether the link shutdown error(s) were detected during the shutdown. If either the domain shutdown errors or the link shutdown errors were not detected during the shutdown, the logic 136 may initiate one or more error correction operations prior to a subsequent startup of the SoC 132.

Additional Notes and Examples

Example 1 may include a system on chip (SoC) comprising one or more substrates and logic coupled to the one or more substrates, wherein the logic includes a plurality of domains and a plurality of links, and wherein the logic is implemented at least partly in one or more of configurable logic or fixed-functionality hardware logic, the logic coupled to the one or more substrates to detect a startup of the SoC, inject, during the startup, one or more domain startup errors into the plurality of domains, determine whether the one or more domain startup errors were detected during the startup, inject, during the startup, one or more link startup errors into plurality of links, determine whether the one or more link startup errors were detected during the startup, detect a shutdown of the SoC, inject, during the shutdown, one or more domain shutdown errors into the plurality of domains, determine whether the one or more domain shutdown errors were detected during the shutdown, inject, during the shutdown, one or more link shutdown errors into the plurality of links, and determine whether the one or more link shutdown errors were detected during the shutdown.

Example 2 may include the semiconductor package apparatus of Example 1, wherein the logic coupled to the one or more substrates is to initiate, prior to completion of the startup, one or more error correction operations if the one or more domain startup errors were not detected during the startup, initiate, prior to completion of the startup, one or more error correction operations if the one or more link startup errors were not detected during the startup, initiate, prior to a subsequent startup of the SoC, one or more error correction operations if the one or more domain shutdown errors were not detected during the shutdown, and initiate, prior to the subsequent startup of the SoC, one or more error correction operations if the one or more link shutdown errors were not detected during the shutdown.

Example 3 may include the semiconductor package apparatus of Example 1, wherein the one or more domain startup errors, the one or more domain shutdown errors, the one or more link startup errors and the one or more link shutdown errors are to include one or more of a parity error, a packet error, a cyclical redundancy check (CRC) error or an error correction code (ECC) error.

Example 4 may include the semiconductor package apparatus of any one of Examples 1 to 4, wherein the one or more domain startup errors and the one or more domain shutdown errors are to be injected into one or more fabric interfaces.

Example 5 may include an autonomous system comprising a plurality of sensors, a display, a network controller, and a system on chip (SoC) coupled to the plurality of sensors, the display and the network controller, the SoC including one or more substrates and logic coupled to the one or more substrates, wherein the logic includes a plurality of domains and the logic is to detect a startup of the SoC, inject, during the startup, one or more domain startup errors into the plurality of domains, and determine whether the one or more domain startup errors were detected during the startup.

Example 6 may include the autonomous system of Example 5, wherein the logic coupled to the one or more substrates is to detect a shutdown of the SoC, inject, during the shutdown, one or more domain shutdown errors into the plurality of domains, and determine whether the one or more domain shutdown errors were detected during the shutdown.

Example 7 may include the autonomous system of Example 6, wherein the logic coupled to the one or more substrates is to initiate, prior to completion of the startup, one or more error correction operations if the one or more domain startup errors were not detected during the startup, and initiate, prior to a subsequent startup of the SoC, one or more error correction operations if the one or more domain shutdown errors were not detected during the shutdown.

Example 8 may include the autonomous system of Example 5, wherein the logic coupled to the one or more substrates further includes a plurality of links, and wherein the logic coupled to the one or more substrates is to inject, during the startup, one or more link startup errors into the plurality of links, determine whether the one or more link startup errors were detected during the startup, and initiate, prior to completion of the startup, one or more error correction operations if the one or more link startup errors were not detected during the startup.

Example 9 may include the autonomous system of Example 8, wherein the logic coupled to the one or more substrates is to detect a shutdown of the SoC, inject, during the shutdown, one or more link shutdown errors into the plurality of links, determine whether the one or more link shutdown errors were detected during the shutdown, and initiate, prior to a subsequent startup of the SoC, one or more error correction operations if the one or more link shutdown errors were not detected during the shutdown.

Example 10 may include the autonomous system of Example 8, wherein the one or more domain startup errors are to include one or more of a parity error, a packet error, a cyclical redundancy check (CRC) error or an error correction code (ECC) error.

Example 11 may include the autonomous system of any one of Examples 5 to 10, wherein the plurality of domains include one or more fabric interfaces.

Example 12 may include a method of detecting errors, comprising detecting a startup of a system on chip (SoC), injecting, during the startup, one or more domain startup errors into a plurality of domains on the SoC, and determining whether the one or more domain startup errors were detected during the startup.

Example 13 may include the method of Example 12, further including detecting a shutdown of the SoC, injecting, during the shutdown, one or more domain shutdown errors into the plurality of domains, and determining whether the one or more domain shutdown errors were detected during the shutdown.

Example 14 may include the method of Example 13, further including initiating, prior to completion of the startup, one or more error correction operations if the one or more domain startup errors were not detected during the startup, and initiating, prior to a subsequent startup of the SoC, one or more error correction operations if the one or more domain shutdown errors were not detected during the shutdown.

Example 15 may include the method of Example 12, further including injecting, during the startup, one or more link startup errors into a plurality of links on the SoC, determining whether the one or more link startup errors were detected during the startup, and initiating, prior to completion of the startup, one or more error correction operations if the one or more link startup errors were not detected during the startup.

Example 16 may include the method of Example 15, further including detecting a shutdown of the SoC, injecting, during the shutdown, one or more link shutdown errors into the plurality of links, determining whether the one or more link shutdown errors were detected during the shutdown, and initiating, prior to a subsequent startup of the SoC, one or more error correction operations if the one or more link shutdown errors were not detected during the shutdown.

Example 17 may include the method of Example 12, wherein the one or more domain startup errors include one or more of a parity error, a packet error, a cyclical redundancy check (CRC) error or an error correction code (ECC) error.

Example 18 may include the method of any one of Examples 12 to 17, wherein the one or more domain startup errors are injected into one or more fabric interfaces.

Example 19 may include a system on chip (SoC) comprising one or more substrates, and logic coupled to the one or more substrates, wherein the logic includes a plurality of domains and is implemented at least partly in one or more of configurable logic or fixed-functionality hardware logic, the logic coupled to the one or more substrates to detect a startup of the SoC, inject, during the startup, one or more domain startup errors into the plurality of domains, and determine whether the one or more domain startup errors were detected during the startup.

Example 20 may include the semiconductor package apparatus of Example 19, wherein the logic coupled to the one or more substrates is to detect a shutdown of the SoC, inject, during the shutdown, one or more domain shutdown errors into the plurality of domains, and determine whether the one or more domain shutdown errors were detected during the shutdown.

Example 21 may include the semiconductor package apparatus of Example 20, wherein the logic coupled to the one or more substrates is to initiate, prior to completion of the startup, one or more error correction operations if the one or more domain startup errors were not detected during the startup, and initiate, prior to a subsequent startup of the SoC, one or more error correction operations if the one or more domain shutdown errors were not detected during the shutdown.

Example 22 may include the semiconductor package apparatus of Example 19, wherein the logic coupled to the one or more substrates further includes a plurality of links, and wherein the logic coupled to the one or more substrates is to inject, during the startup, one or more link startup errors into the plurality of links, determine whether the one or more link startup errors were detected during the startup, and initiate, prior to completion of the startup, one or more error correction operations if the one or more link startup errors were not detected during the startup.

Example 23 may include the semiconductor package apparatus of Example 22, wherein the logic coupled to the one or more substrates is to detect a shutdown of the SoC, inject, during the shutdown, one or more link shutdown errors into the plurality of links, determine whether the one or more link shutdown errors were detected during the shutdown, and initiate, prior to a subsequent startup of the SoC, one or more error correction operations if the one or more link shutdown errors were not detected during the shutdown.

Example 24 may include the semiconductor package apparatus of Example 19, wherein the one or more domain startup errors are to include one or more of a parity error, a packet error, a cyclical redundancy check (CRC) error or an error correction code (ECC) error.

Example 25 may include the semiconductor package apparatus of any one of Examples 19 to 24, wherein the one or more domain startup errors are to be injected into one or more fabric interfaces.

Example 26 may include a semiconductor package apparatus comprising means for detecting a startup of a system on chip (SoC), means for injecting, during the startup, one or more domain startup errors into a plurality of domains on the SoC, and means for determining whether the one or more domain startup errors were detected during the startup.

Example 27 may include the apparatus of Example 26 further including means for detecting a shutdown of the SoC, means for injecting, during the shutdown, one or more domain shutdown errors into the plurality of domains, and means for determining whether the one or more domain shutdown errors were detected during the shutdown.

Example 28 may include the apparatus of Example 27, further including means for initiating, prior to completion of the startup, one or more error correction operations if the one or more domain startup errors were not detected during the startup, and means for initiating, prior to a subsequent startup of the SoC, one or more error correction operations if the one or more domain shutdown errors were not detected during the shutdown.

Example 29 may include the apparatus of Example 26, further including means for injecting, during the startup, one or more link startup errors into a plurality of links on the SoC, means for determining whether the one or more link startup errors were detected during the startup, and means for initiating, prior to completion of the startup, one or more error correction operations if the one or more link startup errors were not detected during the startup.

Example 30 may include the apparatus of Example 29, further including means for detecting a shutdown of the SoC, means for injecting, during the shutdown, one or more link shutdown errors into the plurality of links, means for determining whether the one or more link shutdown errors were detected during the shutdown, and means for initiating, prior to a subsequent startup of the SoC, one or more error correction operations if the one or more link shutdown errors were not detected during the shutdown.

Example 31 may include the apparatus of Example 26, wherein the one or more domain startup errors are to include one or more of a parity error, a packet error, a cyclical redundancy check (CRC) error or an error correction code (ECC) error.

Example 32 may include the apparatus of any one of Examples 26 to 31, wherein the one or more domain startup errors are to be injected into one or more fabric interfaces.

Thus, technology described herein may improve the functional safety capability of processors, complex system fabrics and/or SoCs in an efficient and low latency manner. Additionally, automotive, industrial, artificial intelligence (AI), military, aerospace, governmental and/or other applications may be significantly enhanced through the distributed error injection infrastructure, and corresponding detection and corrective action technology described herein. Indeed, large scale functional failures may be avoided at mission critical moments in time.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A system on chip (SoC) comprising:
one or more substrates; and
logic coupled to the one or more substrates, wherein the logic includes a plurality of domains and a plurality of links, and wherein the logic is implemented at least partly in one or more of configurable logic or fixed-functionality hardware logic, the logic coupled to the one or more substrates to:
    detect a startup of the SoC,
    inject, during the startup, one or more domain startup errors into the plurality of domains,
    determine whether the one or more domain startup errors were detected during the startup,
    inject, during the startup, one or more link startup errors into the plurality of links,
    determine whether the one or more link startup errors were detected during the startup,
    detect a shutdown of the SoC,
    inject, during the shutdown, one or more domain shutdown errors into the plurality of domains,
    determine whether the one or more domain shutdown errors were detected during the shutdown,
    inject, during the shutdown, one or more link shutdown errors into the plurality of links, and
    determine whether the one or more link shutdown errors were detected during the shutdown.

2. The semiconductor package apparatus of claim 1, wherein the logic coupled to the one or more substrates is to:
    initiate, prior to completion of the startup, one or more error correction operations if the one or more domain startup errors were not detected during the startup,
    initiate, prior to completion of the startup, one or more error correction operations if the one or more link startup errors were not detected during the startup,
    initiate, prior to a subsequent startup of the SoC, one or more error correction operations if the one or more domain shutdown errors were not detected during the shutdown, and
    initiate, prior to the subsequent startup of the SoC, one or more error correction operations if the one or more link shutdown errors were not detected during the shutdown.

3. The semiconductor package apparatus of claim 1, wherein the one or more domain startup errors, the one or more domain shutdown errors, the one or more link startup errors and the one or more link shutdown errors are to include one or more of a parity error, a packet error, a cyclical redundancy check (CRC) error or an error correction code (ECC) error.

4. The semiconductor package apparatus of claim 1, wherein the one or more domain startup errors and the one or more domain shutdown errors are to be injected into one or more fabric interfaces.

5. An autonomous system comprising:
    a plurality of sensors;
    a display;
    a network controller; and
    a system on chip (SoC) coupled to the plurality of sensors, the display and the network controller, the SoC including one or more substrates and logic coupled to the one or more substrates, wherein the logic includes a plurality of links and the logic is to:
    detect a startup of the SoC,
    inject, during the startup, one or more link startup errors into the plurality of links,
    determine whether the one or more link startup errors were detected during the startup,
    inject, during the startup, one or more domain startup errors into the plurality of domains,
    determine whether the one or more domain startup errors were detected during the startup, and
    initiate, prior to completion of the startup, one or more error correction operations if the one or more domain startup errors were not detected during the startup.

6. The autonomous system of claim 5, wherein the logic coupled to the one or more substrates is to:
    detect a shutdown of the SoC,
    inject, during the shutdown, one or more link shutdown errors into the plurality of links, and
    determine whether the one or more link shutdown errors were detected during the shutdown.

7. The autonomous system of claim 6, wherein the logic coupled to the one or more substrates is to:
    initiate, prior to completion of the startup, one or more error correction operations if the one or more link startup errors were not detected during the startup, and
    initiate, prior to a subsequent startup of the SoC, one or more error correction operations if the one or more link shutdown errors were not detected during the shutdown.

8. The autonomous system of claim 5, wherein the logic coupled to the one or more substrates is to:
    detect a shutdown of the SoC,
    inject, during the shutdown, one or more domain shutdown errors into the plurality of domains,
    determine whether the one or more domain shutdown errors were detected during the shutdown, and
    initiate, prior to a subsequent startup of the SoC, one or more error correction operations if the one or more domain shutdown errors were not detected during the shutdown.

9. The autonomous system of claim 5, wherein the one or more domain startup errors are to include one or more of a parity error, a packet error, a cyclical redundancy check (CRC) error or an error correction code (ECC) error.

10. The autonomous system of claim 5, wherein the plurality of domains include one or more fabric interfaces.

11. A method comprising:
    detecting a startup of a system on chip (SoC);
    injecting, during the startup, one or more link startup errors into a plurality of links on the SoC;
    determining whether the one or more link startup errors were detected during the startup;
    injecting, during the startup, one or more domain startup errors into a plurality of domains on the SoC;
    determining whether the one or more domain startup errors were detected during the startup; and
    initiating, prior to completion of the startup, one or more error correction operations if the one or more domain startup errors were not detected during the startup.

12. The method of claim 11, further including:
    detecting a shutdown of the SoC;
    injecting, during the shutdown, one or more link shutdown errors into the plurality of links; and
    determining whether the one or more link shutdown errors were detected during the shutdown.

13. The method of claim 12, further including:
    initiating, prior to completion of the startup, one or more error correction operations if the one or more link startup errors were not detected during the startup; and
    initiating, prior to a subsequent startup of the SoC, one or more error correction operations if the one or more link shutdown errors were not detected during the shutdown.

14. The method of claim 11, further including:
    detecting a shutdown of the SoC;
    injecting, during the shutdown, one or more domain shutdown errors into the plurality of domains;

determining whether the one or more domain shutdown errors were detected during the shutdown; and initiating, prior to a subsequent startup of the SoC, one or more error correction operations if the one or more domain shutdown errors were not detected during the shutdown.

15. The method of claim 11, wherein the one or more domain startup errors include one or more of a parity error, a packet error, a cyclical redundancy check (CRC) error or an error correction code (ECC) error.

16. The method of claim 11, wherein the one or more domain startup errors are injected into one or more fabric interfaces.

17. A system on chip (SoC) comprising:
one or more substrates; and
logic coupled to the one or more substrates, wherein the logic includes a plurality of links and is implemented at least partly in one or more of configurable logic or fixed-functionality hardware logic, the logic coupled to the one or more substrates to:
detect a startup of the SoC,
inject, during the startup, one or more link startup errors into the plurality of links,
determine whether the one or more link startup errors were detected during the startup,
inject, during the startup, one or more domain startup errors into the plurality of domains,
determine whether the one or more domain startup errors were detected during the startup; and
initiate, prior to completion of the startup, one or more error correction operations if the one or more domain startup errors were not detected during the startup.

18. The SoC of claim 17, wherein the logic coupled to the one or more substrates is to:
detect a shutdown of the SoC,
inject, during the shutdown, one or more link shutdown errors into the plurality of links, and
determine whether the one or more link shutdown errors were detected during the shutdown.

19. The SoC of claim 18, wherein the logic coupled to the one or more substrates is to:
initiate, prior to completion of the startup, one or more error correction operations if the one or more link startup errors were not detected during the startup, and
initiate, prior to a subsequent startup of the SoC, one or more error correction operations if the one or more link shutdown errors were not detected during the shutdown.

20. The SoC of claim 17, wherein the logic coupled to the one or more substrates is to:
detect a shutdown of the SoC,
inject, during the shutdown, one or more domain shutdown errors into the plurality of domains,
determine whether the one or more domain shutdown errors were detected during the shutdown, and
initiate, prior to a subsequent startup of the SoC, one or more error correction operations if the one or more domain shutdown errors were not detected during the shutdown.

21. The SoC of claim 17, wherein the one or more domain startup errors are to include one or more of a parity error, a packet error, a cyclical redundancy check (CRC) error or an error correction code (ECC) error.

22. The SoC of claim 17, wherein the one or more domain startup errors are to be injected into one or more fabric interfaces.

* * * * *